Patented May 21, 1940

2,201,158

UNITED STATES PATENT OFFICE 2,201,158

(ALKYL-HALO-PHENOXY-ALKYL) (THIOCYANO-ALKYL) ETHERS

Gerald H. Coleman, Midland, Mich., and Robert W. Sapp, Cambridge, Mass., assignors to The Dow Chemical Company, Midland, Mich., a corporation of Michigan No Drawing. Application May 1, 1939, Serial No. 271,172

9 Claims. (Cl. 260—454)

The present invention concerns a new class of compounds, namely, the (alkyl-halo-phenoxy-alkyl) (thiocyano-alkyl) ethers.

These compounds are for the most part viscous, high-boiling liquids substantially insoluble in water, soluble in most petroleum distillate fractions, and somewhat soluble in organic solvents generally. They are useful as insecticidal toxicants, particularly when dissolved in non-corrosive organic solvents.

These compounds may be prepared by reacting the halo-alkoxy-alkyl ethers of alkyl-halo phenols with alkali metal thiocyanates in the presence of alcohol. For example, an ether, such as the beta-chloro-ethoxy-ethyl ether of chloro-meta-cresol, may be dispersed in an alcoholic solution of potassium thiocyanate and the mixture heated to its boiling temperature and under reflux for a period of time sufficient to accomplish the reaction. The reaction temperature is generally between 75° and 90° C., although somewhat lower or higher temperatures may be employed, the reaction being carried out under autogenous pressure where temperatures above the boiling temperature of the reaction mixture prevail. While substantially equimolecular proportions of the ether and inorganic thiocyanate have been found to give the desired organic thiocyanates in good yield, any suitable proportions of reactants may be employed. The alcohol is present in the reaction mixture preferably in amount sufficient to retain the reactants and final thiocyanate ether product in solution. Following the reaction, the major portion of the alcohol solvent may be recovered by distillation and the residue diluted with water, whereby a water-immiscible layer of the (alkyl-halo-phenoxy-alkyl) (thiocyano-alkyl) ether is separated. If desired, this product may be recovered by extraction with a suitable solvent, such as benzene, and the extract fractionally distilled. In an alternate procedure, the water-immiscible layer may be separated, as by decantation, washed with water, and used as an insecticidal toxicant without further treatment. A further purification method consists of filtering the crude reaction mixture to remove insoluble salts and thereafter fractionally distilling to isolate the desired compound.

The (alkyl-halo-phenoxy-alkyl) (halo-alkyl) ethers employed as reactants in the preparation of our new compounds can be obtained by reacting suitable phenolates with the di-(halo-alkyl) ethers under conditions of temperature and pressure that favor the replacement of a single halogen atom by the alkyl-halo-phenoxy group.

A co-pending application Serial No. 225,414, filed August 17, 1938 by G. H. Coleman and C. L. Moyle discloses the preparation and properties of a number of these compounds.

The following examples set forth certain embodiments of our invention, but are not to be construed as limiting the same:

Example 1

88 grams (0.27 mole) of beta-(4-tertiary-butyl-2.6-dichloro-phenoxy)-beta'-chloro-diethyl ether (boiling at 179°–180° C. at 4 millimeters pressure), 29 grams (0.297 mole) of potassium thiocyanate, and 300 milliliters of ethyl alcohol were heated at 80°–81° C. for 48 hours and under reflux. Alcohol was then distilled out of the reaction mixture, the residue diluted with water and extracted with benzene. The benzene extract was dried and fractionally distilled, whereby there was obtained 45 grams (0.13 mole) of beta-(4-tertiary-butyl-2.6-dichloro-phenoxy)-beta'-thiocyano-diethyl ether as a viscous liquid boiling at 227°–229° C. at 4 millimeters pressure and having a specific gravity of 1.225 at 20°/4° C. A 3 per cent solution of this compound in kerosene was tested according to the Peet-Grady method, substantially as described in Soap 8, No. 4, 1932, and found to give a knockdown of 100 per cent in 10 minutes against three-day old house flies. The observed kills after 24 and 48 hours were 85 and 90 per cent, respectively. This spray composition was substantially odorless and had little or no irritating effect upon the mucous membrane.

Example 2

120 grams (0.413 mole) of beta-(4-tertiary-butyl-2-chloro-phenoxy)-beta'-chloro-diethyl ether (boiling at 184°–189° C. at 7 millimeters pressure) was mixed with 40 grams (0.413 mole) of potassum thiocyanate and 150 milliliters of absolute alcohol and the mixture heated to a refluxing temperature for 48 hours. The reaction mixture was diluted with water and extracted with ethylene dibromide. The extract was fractionally distilled, whereby there was obtained 48.9 grams of beta-(4-tertiary-butyl-2-chlorophenoxy)-beta'-thiocyano-diethyl ether as a pale, yellow oil boiling at 245°–249° C. at 12 millimeters pressure and having a specific gravity of 1.166 at 25°/4° C. A 3 per cent solution of this compound in kerosene, when tested as described in Example 1, knocked down 100 per cent of the test insects in 10 minutes and killed 66 per cent and 80 per cent thereof in 24 and 48 hours, respectively.

In a similar manner, related (alkyl-halophenoxy-alkyl) (thiocyano-alkyl) ethers may be prepared by substituting other halo ethers for those shown in the examples. Representative of such compounds are: beta-(2-methyl-4.6-dichloro-phenoxy)-beta'-thiocyano-diethyl ether; beta-(2-methyl-4-bromo-phenoxy)-beta'-thiocyano-diethyl ether; beta-(2-methyl-5-isopropyl-4-bromo-phenoxy)-beta'-thiocyano-diethyl ether; beta-(2-isopropyl-5-methyl-4-chloro-phenoxy)-beta'-thiocyano-diethyl ether; beta-(2.4.5-trimethyl-6-chloro-phenoxy)-beta'-thiocyano-diethyl ether; beta-(2.4.5-trimethyl-3.6-dichloro-phenoxy)-beta'-thiocyano-diethyl ether; beta-(2-tertiary-butyl-3.4.6-trichloro-phenoxy)-beta'-thiocyano-diethyl ether; beta-(3-methyl-2.4.5.6-tetrachloro-phenoxy)-beta'-thiocyano-diethyl ether; beta-(2.5-diisopropyl-4-bromo-phenoxy)-beta'-thiocyano-diethyl ether; beta-(tetramethyl-chloro-phenoxy)-beta'-thiocyano-diethyl ether; beta-(2.4-ditertiary-amyl-6-bromo-phenoxy)-beta'-thiocyano-diethyl ether; beta-(2-iodo-4-tertiary-hexyl-phenoxy)-beta'-thiocyano-diethyl ether; beta-(2-normal-octyl-4-chloro-6-bromo-phenoxy)-beta'-thiocyano-diethyl ether; beta-(4-hexadecyl-6-chloro-phenoxy)-beta'-thiocyano-diethyl ether; beta-(2.4.6-tritertiary-butyl-3-chloro-phenoxy)-beta'-thiocyano-dipropyl ether; gamma-(4-isopropyl-2-bromo-phenoxy)-gamma'-thiocyano-dipropyl ether; (beta-3-methyl-6-bromo-phenoxy-ethyl) (gamma'-thiocyano-propyl) ether; delta-(3-methyl-4-chloro-phenoxy)-delta'-thiocyano-dibutyl ether; (4-ethyl-6-chloro-phenoxy-hexyl) (thiocyano-hexyl) ether.

While the present invention relates broadly to all (alkyl-halo-phenoxy-alkyl) (thiocyano-alkyl) ethers, it is particularly concerned with those compounds having the following formula

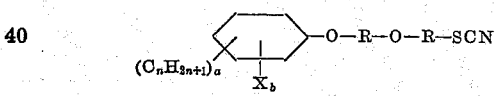

wherein each R represents an alkylene radical, X represents halogen, $n$, $a$, and $b$ are integers, and the sum of $a$ and $b$ is not greater than 5.

This application is a continuation-in-part of our co-pending application Serial No. 229,871, filed September 14, 1938.

We claim:
1. A compound having the formula

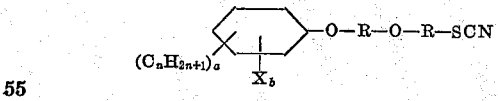

wherein each R represents an alkylene radical, X represents halogen, $n$, $a$, and $b$ are integers, and the sum of $a$ and $b$ is not greater than 5.

2. A compound having the formula

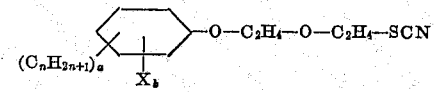

wherein X represents halogen, $n$, $a$, and $b$ are integers, and the sum of $a$ and $b$ is not greater than 5.

3. A compound having the formula

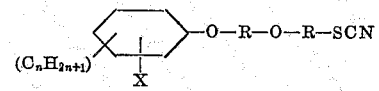

wherein each R represents an alkylene radical, X represents halogen, and $n$ is an integer.

4. A compound having the formula

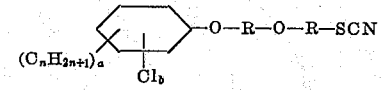

wherein each R represents an alkylene radical, $n$, $a$, and $b$ are integers, and the sum of $a$ and $b$ is not greater than 5.

5. A compound having the formula

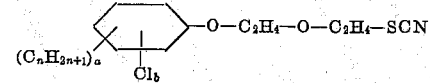

wherein $n$, $a$, and $b$ are integers, and the sum of $a$ and $b$ is not greater than 5.

6. A compound having the formula

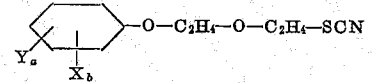

wherein Y represents a branched chain alkyl radical, X represents halogen, and $a$ and $b$ are integers, the sum of which is not greater than 5.

7. A compound having the formula

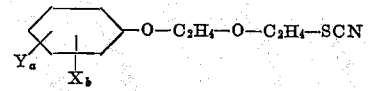

wherein Y represents a tertiary-alkyl radical, X represents halogen, and $a$ and $b$ are integers, the sum of which is not greater than 5.

8. Beta-(4-tertiary-butyl-2-chloro-phenoxy)-beta'-thiocyano-diethyl ether.

9. Beta-(4-tertiary-butyl-2.6-dichloro-phenoxy)-beta'-thiocyano-diethyl ether.

GERALD H. COLEMAN.
ROBERT W. SAPP.